(12) United States Patent
Ryu et al.

(10) Patent No.: US 11,250,298 B1
(45) Date of Patent: Feb. 15, 2022

(54) METHODS FOR TRAINING AND TESTING PERCEPTION NETWORK BY USING IMAGES OBTAINED FROM MULTIPLE IMAGING DEVICES HAVING DIVERSE SPECIFICATIONS AND LEARNING DEVICE AND TESTING DEVICE USING THE SAME

(71) Applicant: Stradvision, Inc., Pohang-si (KR)

(72) Inventors: Wooju Ryu, Pohang-si (KR); Bongnam Kang, Pohang-si (KR)

(73) Assignee: Stradavision, Inc., Pohang-si (KR)

( * ) Notice: Subject to any disclaimer, the term of this patent is extended or adjusted under 35 U.S.C. 154(b) by 0 days.

(21) Appl. No.: 17/213,789

(22) Filed: Mar. 26, 2021

(51) Int. Cl.
*G06K 9/62* (2006.01)
*G06N 3/04* (2006.01)
*G06N 3/08* (2006.01)

(52) U.S. Cl.
CPC ......... *G06K 9/6262* (2013.01); *G06N 3/0454* (2013.01); *G06N 3/08* (2013.01)

(58) Field of Classification Search
CPC ....... G06K 9/6262; G06N 3/08; G06N 3/0454
See application file for complete search history.

(56) References Cited

U.S. PATENT DOCUMENTS

| | | | | |
|---|---|---|---|---|
| 10,311,338 B1 * | 6/2019 | Kim | ....................... | G06N 3/084 |
| 10,373,026 B1 * | 8/2019 | Kim | ..................... | G06K 9/6262 |
| 2016/0321522 A1 * | 11/2016 | Yuan | .................... | G06N 3/0454 |
| 2017/0294010 A1 * | 10/2017 | Shen | ..................... | G06T 7/0002 |

\* cited by examiner

*Primary Examiner* — John W Lee
(74) *Attorney, Agent, or Firm* — Taft Stettinius & Hollister LLP

(57) ABSTRACT

A method for training a perception network includes (a) perceiving first image-level data obtained from a first imaging device through the perception network to generate first prediction results, and training the perception network based on the first prediction results, (b) augmenting the first and second image-level data, respectively obtained from the first and a second imaging device, through a transfer network to generate first and second feature-level data, perceiving the first and the second feature-level data through the perception network to generate second prediction results, and training the transfer network based on the second prediction results, and (c) augmenting the first and the second image-level data through the transfer network to generate third feature-level data, perceiving the third feature-level data through the perception network to generate third prediction results, and retraining the perception network based on the third prediction results.

30 Claims, 7 Drawing Sheets

2000

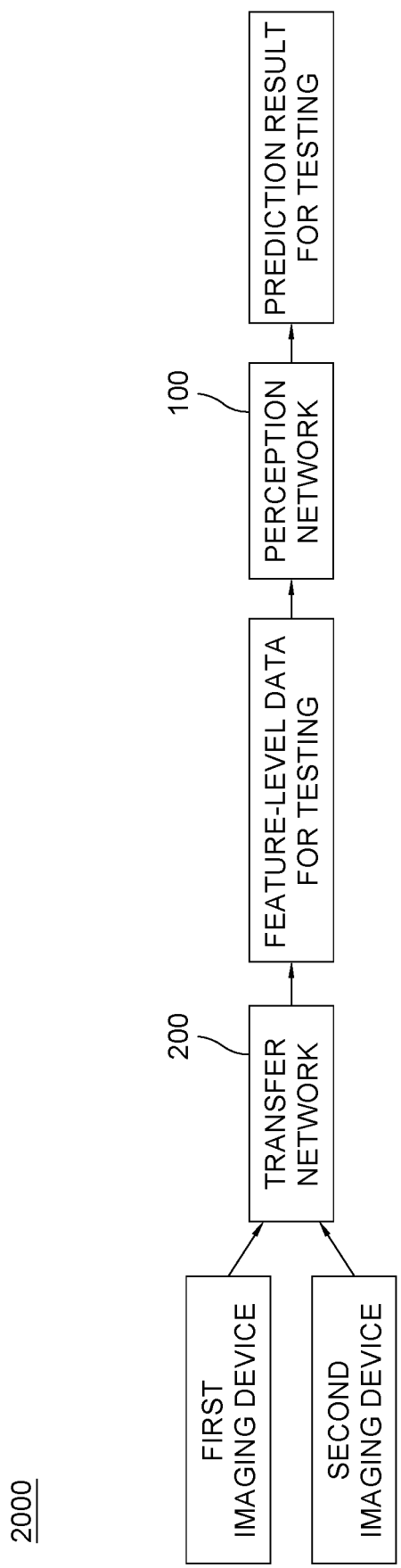

METHODS FOR TRAINING AND TESTING PERCEPTION NETWORK BY USING IMAGES OBTAINED FROM MULTIPLE IMAGING DEVICES HAVING DIVERSE SPECIFICATIONS AND LEARNING DEVICE AND TESTING DEVICE USING THE SAME

FIELD OF THE DISCLOSURE

The present disclosure relates to methods for training and testing perception network by using images obtained from multiple imaging devices having diverse specifications and a learning device and a testing device using the same; and more particularly, to the method for converting image-level data, obtained from the multiple imaging devices having the specifications different from each other, into feature-level data corresponding to a specific image format of a specific imaging device among the multiple imaging devices by augmenting the image-level data with a transfer network and to the method for training and testing the perception network by using the feature-level data, and the learning device and the testing device using the same.

BACKGROUND OF THE DISCLOSURE

A perception network trained through deep-learning is used to assist humans in various fields, such as security systems, robotics, automobiles, medical care, and social media, etc., to recognize and analyze objects on input images. Depending on how the perception network is trained, the perception network is able to perform various types of image analysis like image recognition, object detection, image segmentation, and image tracking. However, in order to create the perception network that can successfully perform its given task of the image analysis, hundreds of thousands of pieces of training data are required to train the perception network.

Therefore, time and cost invested in production and collection of the training data can be greatly saved if the training data collected from various sources can be reused. However, in general, since purposes and usages of the perception network are different for each project that produces and trains the perception network, specifications of imaging devices producing data to be analyzed by the perception network are also bound to be different for each project.

As a result, there is a risk of a drop in performance of the perception network when the perception network having already been trained and optimized for a plurality of specific data produced by a specific imaging device used by a specific project is retrained by reusing a mixture of various training data collected from various imaging devices having various specifications.

On the other hand, if the perception network should be retrained by only using the specific data obtained from the specific imaging device to which the perception network has been optimized, there is a limit to a sufficient data collection and thus inevitably a considerable amount of time is required to improve the performance of the perception network.

Therefore, there is a need for an enhanced method to solve the aforementioned problems.

SUMMARY OF THE DISCLOSURE

It is an object of the present disclosure to solve all the aforementioned problems.

It is another object of the present disclosure to train a perception network, which has been optimized to analyze data produced from a specific imaging device, by utilizing existing training data to minimize a need for new training data.

It is still another object of the present disclosure to convert image-level data, obtained from multiple imaging devices having specifications different from each other, into feature-level data corresponding to a specific image format of the specific imaging device by augmenting the image-level data through a transfer network such that the image-level data obtained from the multiple imaging devices having various specifications are made suitable for learning and testing of the perception network.

It is still yet another object of the present disclosure to allow the perception network to perform its data analysis irrespective of which specific image format of the specific imaging device the perception network has been optimized to by converting the image-level data of various image formats to the feature-level data of the specific image format.

In accordance with one aspect of the present disclosure, there is provided a method for training a perception network by using images obtained from multiple imaging devices having specifications different from each other, including steps of: (a) a learning device performing or supporting another device to perform processes of (i) inputting each of first image-level data obtained from a first imaging device into a perception network, to thereby allow the perception network to perceive each of the first image-level data and thus to generate first prediction results, and (ii) generating each of first losses by referring to each of the first prediction results against each of their corresponding first ground truths of each of the first image-level data and thus training the perception network by using each of the first losses, resulting in a generation of a trained perception network; (b) the learning device performing or supporting another device to perform processes of (i) inputting each of second image-level data, obtained from a second imaging device whose specifications are different from specifications of the first imaging device, and each of the first image-level data into a transfer network, to thereby allow the transfer network to augment each of the first image-level data and each of the second image-level data and thus to generate each of first feature-level data corresponding to each of the first image-level data and each of second feature-level data corresponding to each of the second image-level data, (ii) inputting each of the first feature-level data and each of the second feature-level data into the trained perception network, to thereby allow the trained perception network to perceive each of the first feature-level data and each of the second feature-level data and thus to generate second prediction results, and (iii) generating each of second losses by referring to each of the second prediction results against each of their corresponding first ground truths of each of the first image-level data or each of their corresponding second ground truths of each of the second image-level data and thus training the transfer network by using each of the second losses, resulting in a generation of a trained transfer network; and (c) the learning device performing or supporting another device to perform processes of (i) inputting each of the first image-level data and each of the second image-level data into the trained transfer network, to thereby allow the trained transfer network to augment each of the first image-level data and each of the second image-level data and thus to generate each of third feature-level data corresponding to each of the first image-level data or each of the second image-level data, (ii) inputting each of the third feature-level data into the trained perception network, to thereby allow the trained perception network to perceive each of the third feature-level data and thus to generate third prediction results, and (iii) generating each of third losses by referring to each of the third prediction results against each of their corresponding first ground truths of each of the first image-level data or each of their corresponding second ground truths of each of the second image-level data and thus retraining the trained perception network by using each of the third losses, resulting in a generation of a retrained perception network.

As one example, at the step of (b), the learning device performs or supports another device to perform a process of allowing the transfer network (i) to apply a first convolutional operation to each of the first image-level data and each of the second image-level data through at least one first convolutional layer to thereby generate each of first feature maps corresponding to each of the first image-level data and each of second feature maps corresponding to each of the second image-level data, (ii) to generate each of first augmentation filters corresponding to each of the first image-level data and each of second augmentation filters corresponding to each of the second image-level data through a filter generator, and (iii) to filter each of the first feature maps by using each of the first augmentation filters and filter each of the second feature maps by using each of the second augmentation filters through a dynamic filtering layer to thereby generate each of the first feature-level data and each of the second feature-level data.

As another example, the learning device performs or supports another device to perform a process of allowing the filter generator of the transfer network (i) to apply a second convolutional operation to each of the first image-level data and each of the second image-level data through at least one second convolutional layer to thereby generate each of first intermediate multiple feature maps corresponding to each of the first image-level data and each of second intermediate multiple feature maps corresponding to each of the second image-level data, (ii) to apply a pooling operation to each of the first intermediate multiple feature maps and each of the second intermediate multiple feature maps through a pooling layer to thereby generate each of first multiple pixel features corresponding to each of the first intermediate multiple feature maps and each of second multiple pixel features corresponding to each of the second intermediate multiple feature maps, and (iii) to reshape each of the first multiple pixel features and each of the second multiple pixel features through a reshaping layer to thereby generate each of the first augmentation filters corresponding to each of the first multiple pixel features and each of the second augmentation filters corresponding to each of the second multiple pixel features.

As another example, the learning device performs or supports another device to perform a process of allowing the transfer network (i) to generate each of the first feature maps, each of the first intermediate multiple feature maps, and each of the first feature-level data, each of which has a size same as a size of each of the first image-level data, and (ii) to generate each of the second feature maps, each of the second intermediate multiple feature maps, and each of the second feature-level data, each of which has a size same as a size of each of the second image-level data.

As another example, the learning device performs or supports another device to perform a process of allowing the transfer network (i) to add first zero padding to each of the first image-level data and each of the second image-level data inputted into the first convolutional layer to thereby generate each of (1_1)-st padded image-level data and each of (2_1)-st padded image-level data, and then to apply the first convolutional operation to each of the (1_1)-st padded image-level data and each of the (2_1)-st padded image-level data to thereby generate each of the first feature maps, each of which has a size same as a size of each of the first image-level data, and generate each of the second feature maps, each of which has a size same as a size of the second image-level data, and (ii) to add second zero padding to each of the first feature maps and each of the second feature maps inputted into the dynamic filtering layer to thereby generate each of first padded feature maps and each of second padded feature maps, and then to filter each of the first padded feature maps by using each of the first augmentation filters and filter each of the second padded feature maps by using each of the second augmentation filters to thereby generate each of the first feature-level data, each of which has a size same as the size of each of the first image-level data, and generate each of the second feature-level data, each of which has a size same as the size of each of the second image-level data.

As another example, the learning device performs or supports another device to perform a process of allowing the filter generator of the transfer network to add third zero padding to each of the first image-level data and each of the second image-level data inputted into the second convolution layer to thereby generate each of (1_2)-nd padded image-level data and each of (2_2)-nd padded image-level data, and then to apply the second convolution operation to each of the (1_2)-nd image-level data and each of the (2_2)-nd image-level data to thereby generate each of the first intermediate multiple feature maps, each of which has a size same as a size of each of the first image-level data, and generate each of the second intermediate multiple feature maps, each of which has a size same as a size of each of the second image-level data.

As another example, the learning device performs or supports another device to perform a process of allowing the filter generator of the transfer network (i) to apply the second convolution operation to each of the first image-level data and each of the second image-level data by using each of $n^2$ convolution filters through the second convolutional layer to thereby generate each of the first intermediate multiple feature maps having $n^2$ channels and each of the second intermediate multiple feature maps having $n^2$ channels, (ii) to apply a global average pooling operation or a global max pooling operation to each of the first intermediate multiple feature maps and each of the second intermediate multiple feature maps through the pooling layer to thereby generate each of the first multiple pixel features having $n^2$ channels and each of the second multiple pixel features having $n^2$ channels, and (iii) to reshape each of the first multiple pixel features into a single channel and reshape each of the second multiple pixel features into a single channel to thereby generate each of the first augmentation filters having a dimension of $n \times n \times 1$ and each of the second augmentation filters having a dimension of $n \times n \times 1$.

As another example, at least one of sensor type, megapixel count, aspect ratio, ISO sensitivity, shutter speed, and focus area included in the specifications of the second imaging device is different from at least one of those of the first imaging device.

As another example, the perception network includes at least one of a recognition network capable of recognizing each of the first image-level data and each of the second image-level data, an object detection network capable of detecting objects on each of the first image-level data and each of the second image-level data, a segmentation network capable of classifying each of pixels included in each of the first image-level data and each of the second image-level data, and a tracking network capable of tracking the objects on each of the first image-level data and each of the second image-level data.

In accordance with another aspect of the present disclosure, there is provided a method for testing a perception network by using images obtained from multiple imaging devices having specifications different from each other, including steps of: (a) on condition that a learning device has performed or supported another device to perform processes of (i) (i-1) inputting each of first image-level data for training obtained from a first imaging device into a perception network, to thereby allow the perception network to perceive each of the first image-level data for training and thus to generate first prediction results for training, and (i-2) generating each of first losses by referring to each of the first prediction results for training against each of their corresponding first ground truths of each of the first image-level data for training and thus training the perception network by using each of the first losses, resulting in a generation of a trained perception network, (ii) (ii-1) inputting each of second image-level data for training, obtained from a second imaging device whose specifications are different from specifications of the first imaging device, and each of the first image-level data for training into a transfer network, to thereby allow the transfer network to augment each of the first image-level data for training and each of the second image-level data for training and thus to generate each of first feature-level data for training corresponding to each of the first image-level data for training and each of second feature-level data for training corresponding to each of the second image-level data for training, (ii-2) inputting each of the first feature-level data for training and each of the second feature-level data for training into the trained perception network, to thereby allow the trained perception network to perceive each of the first feature-level data for training and each of the second feature-level data for training and thus to generate second prediction results for training, and (ii-3) generating each of second losses by referring to each of the second prediction results for training against each of their corresponding first ground truths of each of the first image-level data for training or each of their corresponding second ground truths of each of the second image-level data for training and thus training the transfer network by using each of the second losses, resulting in a generation of a trained transfer network, and (iii) (iii-1) inputting each of the first image-level data for training and each of the second image-level data for training into the trained transfer network, to thereby allow the trained transfer network to augment each of the first image-level data for training and each of the second image-level data for training and thus to generate each of third feature-level data for training corresponding each of the first image-level data for training or each of the second image-level data for training, (iii-2) inputting each of the third feature-level data for training into the trained perception network, to thereby allow the trained perception network to perceive each of the third feature-level data for training and thus to generate third prediction results for training, and (iii-3) generating each of third losses by referring to each of the third prediction results for training against each of their corresponding first ground truths of each of the first image-level data for training or each of their corresponding second ground truths of each of the second image-level data for training and thus retraining the trained perception network by using each of the third losses, resulting in a generation of a retrained perception network, a testing device performing or supporting another device to perform a process of acquiring at least one image-level data for testing from the first imaging device or the second imaging device; and (b) the testing device performing or supporting another device to perform processes of (i) inputting the image-level data for testing into the trained transfer network, to thereby allow the trained transfer network to augment the image-level data for testing and thus to generate a feature-level data for testing corresponding to the image-level data for testing, and (ii) inputting the feature-level data for testing into the retrained perception network, to thereby allow the retrained perception network to perceive the feature-level data for testing and thus to generate a prediction result for testing.

As one example, at the step of (b), the testing device performs or supports another device to perform a process of allowing the trained transfer network (i) to apply a first convolutional operation to the image-level data for testing through at least one first convolutional layer to thereby generate a feature map for testing corresponding to the image-level data for testing, (ii) to generate an augmentation filter for testing corresponding to the image-level data for testing through a filter generator, and (iii) to filter the feature map for testing by using the augmentation filter for testing through a dynamic filtering layer to thereby generate the feature-level data for testing.

As another example, the testing device performs or supports another device to perform a process of allowing the filter generator of the trained transfer network (i) to apply a second convolutional operation to the image-level data for testing through at least one second convolutional layer to thereby generate intermediate multiple feature maps for testing corresponding to the image-level data for testing, (ii) to apply a pooling operation to the intermediate multiple feature maps for testing through a pooling layer to thereby generate multiple pixel features for testing corresponding to the intermediate multiple feature maps for testing, and (iii) to reshape the multiple pixel features for testing through a reshaping layer to thereby generate the augmentation filter for testing corresponding to the multiple pixel features for testing.

As another example, the testing device performs or supports another device to perform a process of allowing the trained transfer network to generate the feature map for testing, the intermediate multiple feature maps for testing, and the feature-level data for testing, each of which has a size same as a size of the image-level data for testing.

As another example, the testing device performs or supports another device to perform a process of allowing the trained transfer network (i) to add first zero padding to the image-level data for testing inputted into the first convolutional layer to thereby generate a first padded image-level data for testing, and then to apply the first convolutional operation to the first padded image-level data for testing to thereby generate the feature map for testing, which has a size same as a size of the image-level data for testing, and (ii) to add second zero padding to the feature map for testing inputted into the dynamic filtering layer to thereby generate a padded feature map for testing, and then to filter the padded feature map for testing by using the augmentation filter for testing to thereby generate the feature-level data for testing, which has a size same as the size of the image-level data for testing.

As another example, the testing device performs or supports another device to perform a process of allowing the filter generator of the trained transfer network to add third zero padding to the image-level data for testing inputted into the second convolution layer to thereby generate a second padded image-level data for testing, and then to apply the second convolution operation to the second padded image-level data for testing to thereby generate the intermediate multiple feature maps for testing, each of which has a size same as a size of the image-level data for testing.

As another example, the testing device performs or supports another device to perform a process of allowing the filter generator of the trained transfer network (i) to apply the second convolution operation to the image-level data for testing by using $n^2$ convolution filters through the second convolutional layer to thereby generate the intermediate multiple feature maps for testing having $n^2$ channels, (ii) to apply a global average pooling operation or a global max pooling operation to the intermediate multiple feature maps for testing through the pooling layer to thereby generate the multiple pixel features for testing having $n^2$ channels, and (iii) to reshape the multiple pixel features for testing into a single channel to thereby generate the augmentation filter for testing having a dimension of n×n×1.

In accordance with still another aspect of the present disclosure, there is provided a learning device for training a perception network by using images obtained from multiple imaging devices having specifications different from each other, including: at least one memory that stores instructions; and at least one processor configured to execute the instructions to perform or support another device to perform: processes of (I) (i) inputting each of first image-level data obtained from a first imaging device into a perception network, to thereby allow the perception network to perceive each of the first image-level data and thus to generate first prediction results, and (ii) generating each of first losses by referring to each of the first prediction results against each of their corresponding first ground truths of each of the first image-level data and thus training the perception network by using each of the first losses, resulting in a generation of a trained perception network, (II) (i) inputting each of second image-level data, obtained from a second imaging device whose specifications are different from specifications of the first imaging device, and each of the first image-level data into a transfer network, to thereby allow the transfer network to augment each of the first image-level data and each of the second image-level data and thus to generate each of first feature-level data corresponding to each of the first image-level data and each of second feature-level data corresponding to each of the second image-level data, (ii) inputting each of the first feature-level data and each of the second feature-level data into the trained perception network, to thereby allow the trained perception network to perceive each of the first feature-level data and each of the second feature-level data and thus to generate second prediction results, and (iii) generating each of second losses by referring to each of the second prediction results against each of their corresponding first ground truths of each of the first image-level data or each of their corresponding second ground truths of each of the second image-level data and thus training the transfer network by using each of the second losses, resulting in a generation of a trained transfer network, and (III) (i) inputting each of the first image-level data and each of the second image-level data into the trained transfer network, to thereby allow the trained transfer network to augment each of the first image-level data and each of the second image-level data and thus to generate each of third feature-level data corresponding to each of the first image-level data or each of the second image-level data, (ii) inputting each of the third feature-level data into the trained perception network, to thereby allow the trained perception network to perceive each of the third feature-level data and thus to generate third prediction results, and (iii) generating each of third losses by referring to each of the third prediction results against each of their corresponding first ground truths of each of the first image-level data or each of their corresponding second ground truths of each of the second image-level data and thus retraining the trained perception network by using each of the third losses, resulting in a generation of a retrained perception network.

As one example, at the process of (II), the processor performs or supports another device to perform a process of allowing the transfer network (i) to apply a first convolutional operation to each of the first image-level data and each of the second image-level data through at least one first convolutional layer to thereby generate each of first feature maps corresponding to each of the first image-level data and each of second feature maps corresponding to each of the second image-level data, (ii) to generate each of first augmentation filters corresponding to each of the first image-level data and each of second augmentation filters corresponding to each of the second image-level data through a filter generator, and (iii) to filter each of the first feature maps by using each of the first augmentation filters and filter each of the second feature maps by using each of the second augmentation filters through a dynamic filtering layer to thereby generate each of the first feature-level data and each of the second feature-level data.

As another example, the processor performs or supports another device to perform a process of allowing the filter generator of the transfer network (i) to apply a second convolutional operation to each of the first image-level data and each of the second image-level data through at least one second convolutional layer to thereby generate each of first intermediate multiple feature maps corresponding to each of the first image-level data and each of second intermediate multiple feature maps corresponding to each of the second image-level data, (ii) to apply a pooling operation to each of the first intermediate multiple feature maps and each of the second intermediate multiple feature maps through a pooling layer to thereby generate each of first multiple pixel features corresponding to each of the first intermediate multiple feature maps and each of second multiple pixel features corresponding to each of the second intermediate multiple feature maps, and (iii) to reshape each of the first multiple pixel features and each of the second multiple pixel features through a reshaping layer to thereby generate each of the first augmentation filters corresponding to each of the first multiple pixel features and each of the second augmentation filters corresponding to each of the second multiple pixel features.

As another example, the processor performs or supports another device to perform a process of allowing the transfer network (i) to generate each of the first feature maps, each of the first intermediate multiple feature maps, and each of the first feature-level data, each of which has a size same as a size of each of the first image-level data, and (ii) to generate each of the second feature maps, each of the second intermediate multiple feature maps, and each of the second feature-level data, each of which has a size same as a size of each of the second image-level data.

As another example, the processor performs or supports another device to perform a process of allowing the transfer network (i) to add first zero padding to each of the first image-level data and each of the second image-level data inputted into the first convolutional layer to thereby generate each of (1_1)-st padded image-level data and each of (2_1)-st padded image-level data, and then to apply the first convolutional operation to each of the (1_1)-st padded image-level data and each of the (2_1)-st padded image-level data to thereby generate each of the first feature maps, each of which has a size same as a size of each of the first image-level data, and generate each of the second feature maps, each of which has a size same as a size of the second image-level data, and (ii) to add second zero padding to each of the first feature maps and each of the second feature maps inputted into the dynamic filtering layer to thereby generate each of first padded feature maps and each of second padded feature maps, and then to filter each of the first padded feature maps by using each of the first augmentation filters and filter each of the second padded feature maps by using each of the second augmentation filters to thereby generate each of the first feature-level data, each of which has a size same as the size of each of the first image-level data, and generate each of the second feature-level data, each of which has a size same as the size of each of the second image-level data.

As another example, the processor performs or supports another device to perform a process of allowing the filter generator of the transfer network to add third zero padding to each of the first image-level data and each of the second image-level data inputted into the second convolution layer to thereby generate each of (1_2)-nd padded image-level data and each of (2_2)-nd padded image-level data, and then to apply the second convolution operation to each of the (1_2)-nd image-level data and each of the (2_2)-nd image-level data to thereby generate each of the first intermediate multiple feature maps, each of which has a size same as a size of each of the first image-level data, and generate each of the second intermediate multiple feature maps, each of which has a size same as a size of each of the second image-level data.

As another example, the processor performs or supports another device to perform a process of allowing the filter generator of the transfer network (i) to apply the second convolution operation to each of the first image-level data and each of the second image-level data by using each of $n^2$ convolution filters through the second convolutional layer to thereby generate each of the first intermediate multiple feature maps having $n^2$ channels and each of the second intermediate multiple feature maps having $n^2$ channels, (ii) to apply a global average pooling operation or a global max pooling operation to each of the first intermediate multiple feature maps and each of the second intermediate multiple feature maps through the pooling layer to thereby generate each of the first multiple pixel features having $n^2$ channels and each of the second multiple pixel features having $n^2$ channels, and (iii) to reshape each of the first multiple pixel features into a single channel and reshape each of the second multiple pixel features into a single channel to thereby generate each of the first augmentation filters having a dimension of $n \times n \times 1$ and each of the second augmentation filters having a dimension of $n \times n \times 1$.

In accordance with still yet another aspect of the present disclosure, there is provided a training device for testing a perception network by using images obtained from multiple imaging devices having specifications different from each other, including: at least one memory that stores instructions; and at least one processor configured to execute the instructions to perform or support another device to perform: processes of (I) on condition that a learning device has performed or supported another device to perform processes of (i) (i-1) inputting each of first image-level data for training obtained from a first imaging device into a perception network, to thereby allow the perception network to perceive each of the first image-level data for training and thus to generate first prediction results for training, and (i-2) generating each of first losses by referring to each of the first prediction results for training against each of their corresponding first ground truths of each of the first image-level data for training and thus training the perception network by using each of the first losses, resulting in a generation of a trained perception network, (ii) (ii-1) inputting each of second image-level data for training, obtained from a second imaging device whose specifications are different from specifications of the first imaging device, and each of the first image-level data for training into a transfer network, to thereby allow the transfer network to augment each of the first image-level data for training and each of the second image-level data for training and thus to generate each of first feature-level data for training corresponding to each of the first image-level data for training and each of second feature-level data for training corresponding to each of the second image-level data for training, (ii-2) inputting each of the first feature-level data for training and each of the second feature-level data for training into the trained perception network, to thereby allow the trained perception network to perceive each of the first feature-level data for training and each of the second feature-level data for training and thus to generate second prediction results for training, and (ii-3) generating each of second losses by referring to each of the second prediction results for training against each of their corresponding first ground truths of each of the first image-level data for training or each of their corresponding second ground truths of each of the second image-level data for training and thus training the transfer network by using each of the second losses, resulting in a generation of a trained transfer network, and (iii) (iii-1) inputting each of the first image-level data for training and each of the second image-level data for training into the trained transfer network, to thereby allow the trained transfer network to augment each of the first image-level data for training and each of the second image-level data for training and thus to generate each of third feature-level data for training corresponding to each of the first image-level data for training or each of the second image-level data for training, (iii-2) inputting each of the third feature-level data for training into the trained perception network, to thereby allow the trained perception network to perceive each of the third feature-level data for training and thus to generate third prediction results for training, and (iii-3) generating each of third losses by referring to each of the third prediction results for training against each of their corresponding first ground truths of each of the first image-level data for training or each of their corresponding second ground truths of each of the second image-level data for training and thus retraining the trained perception network by using each of the third losses, resulting in a generation of a retrained perception network, acquiring at least one image-level data for testing from the first imaging device or the second imaging device, (II) (i) inputting the image-level data for testing into the trained transfer network, to thereby allow the trained transfer network to augment the image-level data for testing and thus to generate a feature-level data for testing corresponding to the image-level data for testing, and (ii) inputting the feature-level data for testing into the retrained perception network, to thereby allow the retrained perception network to perceive the feature-level data for testing and thus to generate a prediction result for testing.

As one example, at the process of (II), the processor performs or supports another device to perform a process of allowing the trained transfer network (i) to apply a first convolutional operation to the image-level data for testing through at least one first convolutional layer to thereby generate a feature map for testing corresponding to the image-level data for testing, (ii) to generate an augmentation filter for testing corresponding to the image-level data for testing through a filter generator, and (iii) to filter the feature map for testing by using the augmentation filter for testing through a dynamic filtering layer to thereby generate the feature-level data for testing.

As another example, the processor performs or supports another device to perform a process of allowing the filter generator of the trained transfer network (i) to apply a second convolutional operation to the image-level data for testing through at least one second convolutional layer to thereby generate intermediate multiple feature maps for testing corresponding to the image-level data for testing, (ii) to apply a pooling operation to the intermediate multiple feature maps for testing through a pooling layer to thereby generate multiple pixel features for testing corresponding to the intermediate multiple feature maps for testing, and (iii) to reshape the multiple pixel features for testing through a reshaping layer to thereby generate the augmentation filter for testing corresponding to the multiple pixel features for testing.

As another example, the processor performs or supports another device to perform a process of allowing the trained transfer network to generate the feature map for testing, the intermediate multiple feature maps for testing, and the feature-level data for testing, each of which has a size same as a size of the image-level data for testing.

As another example, the processor performs or supports another device to perform a process of allowing the trained transfer network (i) to add first zero padding to the image-level data for testing inputted into the first convolutional layer to thereby generate a first padded image-level data for testing, and then to apply the first convolutional operation to the first padded image-level data for testing to thereby generate the feature map for testing, which has a size same as a size of the image-level data for testing, and (ii) to add second zero padding to the feature map for testing inputted into the dynamic filtering layer to thereby generate a padded feature map for testing, and then to filter the padded feature map for testing by using the augmentation filter for testing to thereby generate the feature-level data for testing, which has a size same as the size of the image-level data for testing.

As another example, the processor performs or supports another device to perform a process of allowing the filter generator of the trained transfer network to add third zero padding to the image-level data for testing inputted into the second convolution layer to thereby generate a second padded image-level data for testing, and then to apply the second convolution operation to the second padded image-level data for testing to thereby generate the intermediate multiple feature maps for testing, each of which has a size same as a size of the image-level data for testing.

As another example, the processor performs or supports another device to perform a process of allowing the filter generator of the trained transfer network (i) to apply the second convolution operation to the image-level data for testing by using $n^2$ convolution filters through the second convolutional layer to thereby generate the intermediate multiple feature maps for testing having $n^2$ channels, (ii) to apply a global average pooling operation or a global max pooling operation to the intermediate multiple feature maps for testing through the pooling layer to thereby generate the multiple pixel features for testing having $n^2$ channels, and (iii) to reshape the multiple pixel features for testing into a single channel to thereby generate the augmentation filter for testing having a dimension of n×n×1.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 7 is a drawing schematically illustrating a process for testing the perception network by using the image-level data obtained from the multiple imaging devices having the specifications different from each other in accordance with one example embodiment of the present disclosure.

DETAILED DESCRIPTION OF THE PREFERRED EMBODIMENTS

Figure 1:
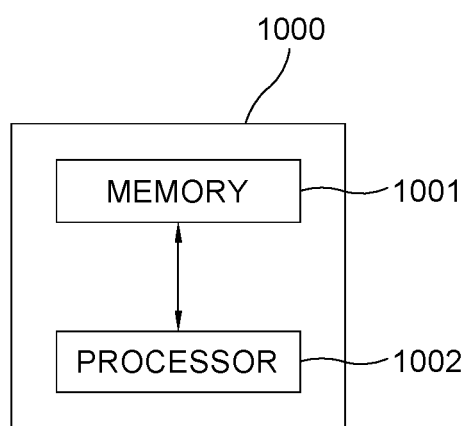
FIG. 1 is a drawing schematically illustrating a learning device for training a perception network by using image-level data obtained from multiple imaging devices having specifications different from each other in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a learning device 1000 for training a perception network by using image-level data obtained from multiple imaging devices having specifications different from each other in accordance with one example embodiment of the present disclosure.

By referring to FIG. 1, the learning device 1000 may include a memory 1001 for training the perception network by using the image-level data obtained from the multiple imaging devices having the specifications different from each other, and a processor 1002 for training the perception network by using the image-level data obtained from the multiple imaging devices having the specifications different from each other according to the instructions in the memory 1001.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of training the perception network with the image-level data obtained from the multiple imaging devices having the specifications different from each other by using the learning device 1000 configured as explained above is described by referring to FIGS. 2 to 5.

Figure 2:
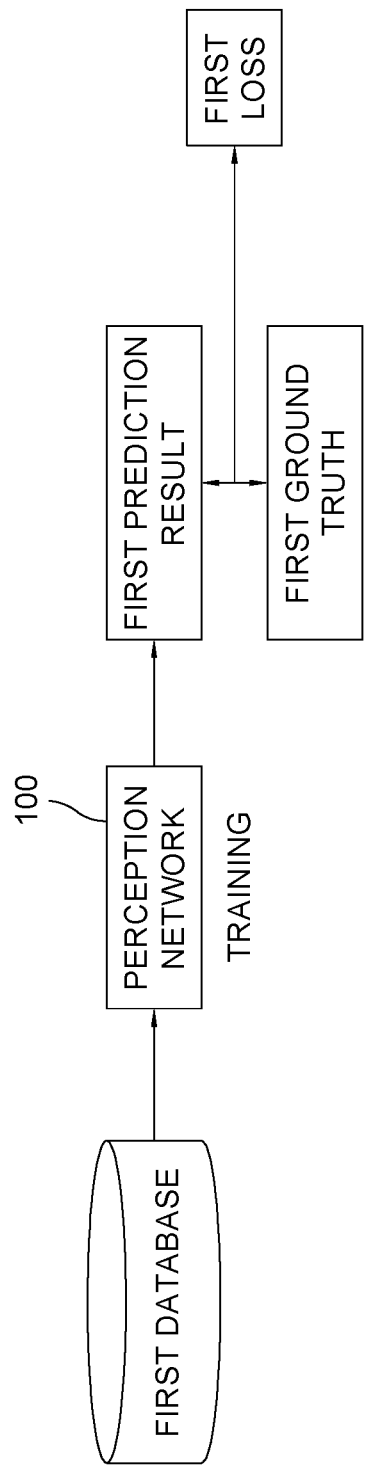
FIG. 2 is a drawing schematically illustrating a process for training the perception network by using image-level data obtained from a specific imaging device in accordance with one example embodiment of the present disclosure.

First, FIG. 2 is a drawing schematically illustrating a process for training the perception network by using image-level data obtained from a specific imaging device in accordance with one example embodiment of the present disclosure. Hereinafter, the specific imaging device to which the perception network 100 is to be optimized may be referred to as a first imaging device.

By referring to FIG. 2, the learning device 1000 may sample first image-level data to be used for training the perception network 100 from a first database where images obtained from the first imaging device (not shown) are stored.

Herein, the first image-level data may be the images themselves obtained from the first imaging device or may be training images with their labels, i.e., first ground truths.

Thereafter, the learning device 1000 may input each of the first image-level data obtained from the first imaging device, i.e., each of the first image-level data sampled from the first database, into the perception network 100, to thereby allow the perception network to perceive each of the first image-level data and thus to generate first prediction results.

Herein, the perception network 100 may include various types of deep neural networks according to a task to be performed by the perception network 100.

For example, the perception network 100 may include at least one of a recognition network capable of recognizing each of the image-level data obtained from the multiple imaging devices, an object detection network capable of detecting objects on each of the image-level data obtained from the multiple imaging devices, a segmentation network capable of classifying each of pixels included in each of the image-level data obtained from the multiple imaging devices, and a tracking network capable of tracking the objects on each of the image-level data obtained from the multiple imaging devices. Herein, the image-level data obtained from the multiple imaging devices may include the first image-level data obtained from the first imaging device and other image-level data obtained from other imaging devices, e.g., a second imaging device, whose specifications are different from specifications of the first imaging device.

Accordingly, output forms of the first prediction results may vary depending on the task to be performed by the perception network 100, and the output forms may include at least one of image recognition information, object detection information, image segmentation information, image tracking information, etc.

Next, the learning device 1000 may generate each of first losses by referring to each of the first prediction results against each of their corresponding first ground truths and thus train the perception network 100 by using each of the first losses, resulting in a generation of a trained perception network 100.

For example, the learning device 1000 may train the perception network 100 by updating weights of the perception network 100 through back-propagation using the first losses.

Figure 3:
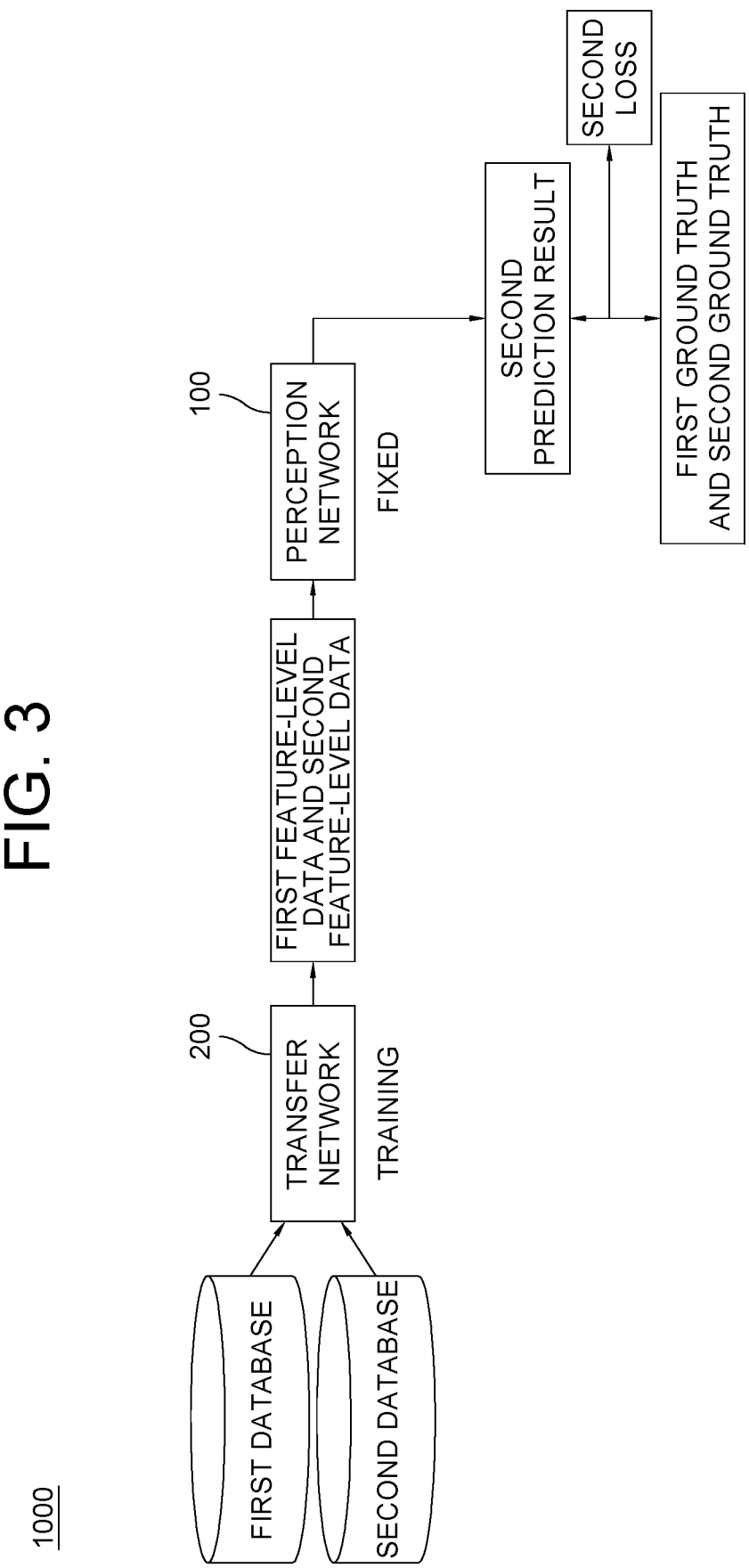
FIG. 3 is a drawing schematically illustrating a process for training a transfer network to convert the image-level data, obtained from the multiple imaging devices having the specifications different from each other, into feature-level data corresponding to a specific image format of the specific imaging device in accordance with one example embodiment of the present disclosure.

Next, FIG. 3 is schematically illustrating a process for training a transfer network 200 to convert the image-level data, obtained from the multiple imaging devices having the specifications different from each other, into feature-level data corresponding to a specific image format of the specific imaging device in accordance with one example embodiment of the present disclosure.

Herein, in accordance with one example embodiment of the present disclosure, the perception network 100 having been optimized to the first imaging-device can be trained and tested by using the first image-level data obtained from the first imaging device and the second image-level data obtained from the second imaging device. However, the present disclosure is not limited thereto, and may be applied to methods of training and testing the perception network 100 having been optimized to the first imaging device by using more than one kind of other imaging devices having different specifications from the first imaging device.

Also, at least one of sensor type, megapixel count, aspect ratio, ISO sensitivity, shutter speed, and focus area included in the specifications of the second imaging device may be different from at least one of those of the first imaging device.

By referring to FIG. 3, the learning device 1000 may sample the first image-level data and second image-level data to be used for training the transfer network 200 respectively from the first database and a second database. Herein, the second database may be storing images obtained from the second imaging device.

Herein, the first image-level data and the second image-level data may be images themselves obtained respectively from the first imaging device and the second imaging device or may be training images with their labels, i.e., the first ground truths and second ground truths. Also, the first image-level data and the second image-level data may have different characteristics, i.e., different image quality characteristics, in response to the different specifications of the first imaging device and the second imaging device. The image quality characteristics, herein, may include resolution, noise, brightness, contrast (gamma), color accuracy, and the like, but the present disclosure is not limited thereto.

Then, the learning device 1000 may input each of the first image-level data and each of the second image-level data into the transfer network 200, to thereby allow the transfer network 200 to augment each of the first image-level data and each of the second image-level data and thus to generate each of first feature-level data corresponding to each of the first image-level data and each of second feature-level data corresponding to each of the second image-level data.

Herein, through augmentation of each of the first image-level data and each of the second image-level data, the transfer network 200 may convert the first image-level data into the first feature-level data which preserve the image quality characteristics of the first image-level data and convert the second image-level data into the second feature-level data which possess the image quality characteristics of the first image-level data.

Figure 4:
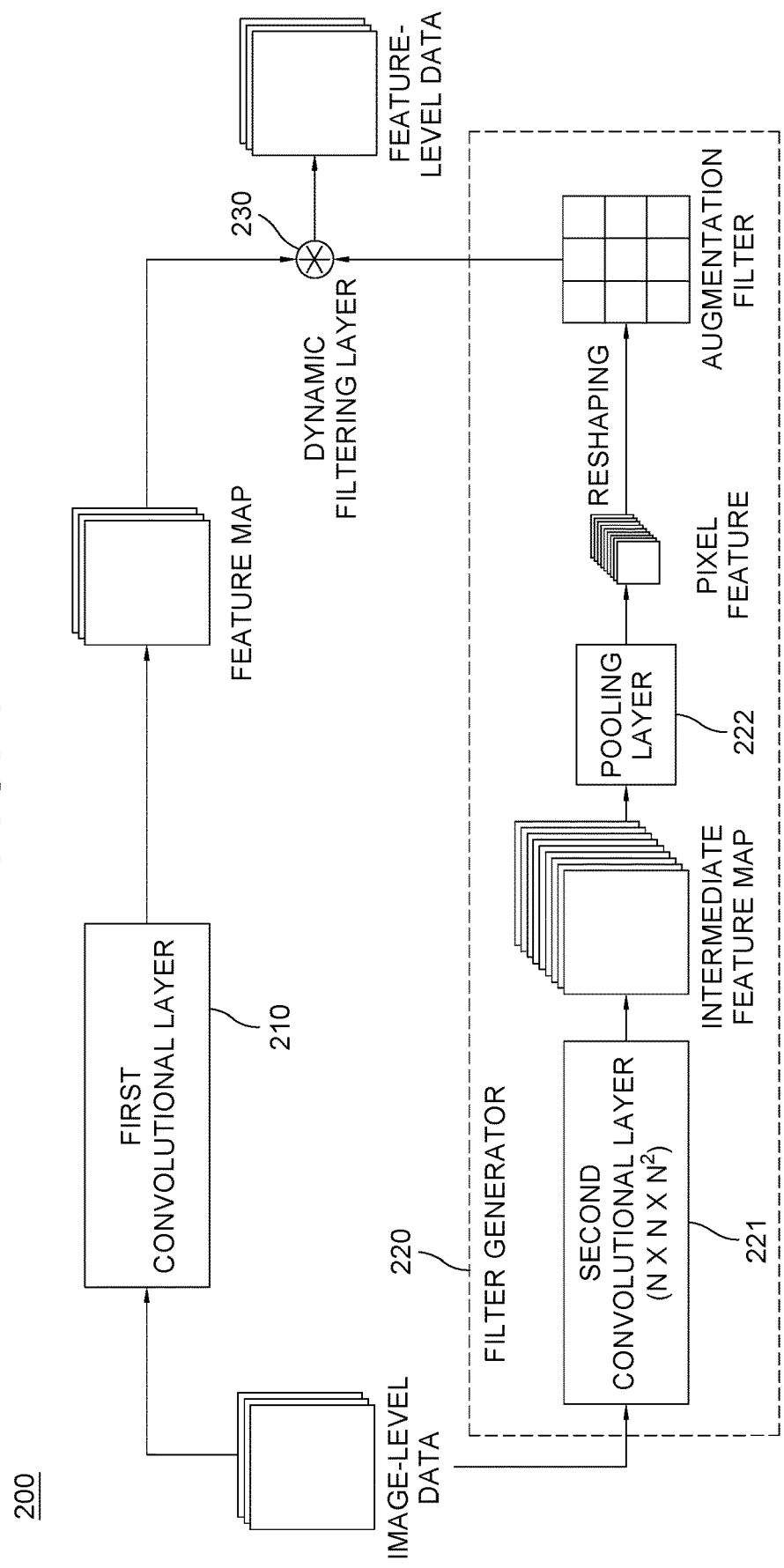
FIG. 4 is a drawing schematically illustrating a process for converting the image-level data, obtained from the multiple imaging devices having the specifications different from each other, into the feature-level data corresponding to the specific image format of the specific imaging device by augmenting the image-level data with the transfer network in accordance with one example embodiment of the present disclosure.

In detail, FIG. 4 is schematically illustrating a process for converting the image-level data, obtained from the multiple imaging devices having the specifications different from each other, into the feature-level data corresponding to the specific image format of the specific imaging device by augmenting the image-level data with the transfer network in accordance with one example embodiment of the present disclosure.

By referring to FIG. 4, the learning device 1000 may allow the transfer network 200 to apply a first convolutional operation to each of the first image-level data and each of the second image-level data through at least one first convolutional layer 210 to thereby generate each of first feature maps corresponding to each of the first image-level data and each of second feature maps corresponding to each of the second image-level data.

Herein, the learning device 1000 may allow the transfer network 200 to generate each of the first feature maps, each of which has a size same as a size of each of the first image-level data, and to generate each of the second feature maps, each of which has a size same as a size of each of the second image-level data. For example, the learning device 1000 may allow the transfer network 200 to add first zero padding to each of the first image-level data and each of the second image-level data inputted into the first convolutional layer 210 to thereby generate each of (1_1)-st padded image-level data and each of (2_1)-st padded image-level data, and then to apply the first convolutional operation to each of the (1_1)-st padded image-level data and each of the (2_1)-st padded image-level data to thereby generate each of the first feature maps, each of which has the size same as the size of each of the first image-level data, and generate each of the second feature maps, each of which has the size same as the size of each of the second image-level data. Herein, the first image-level data and the second image-level data may be images of the same size but the present disclosure is not limited thereto.

Following, the learning device 1000 may allow the transfer network 200 to generate each of first augmentation filters corresponding to each of the first image-level data and each of second augmentation filters corresponding to each of the second image-level data through a filter generator 220, and then to filter each of the first feature maps by using each of the first augmentation filters and filter each of the second feature maps by using each of the second augmentation filters through a dynamic filtering layer 230 to thereby generate each of the first feature-level data and each of the second feature-level data.

Meanwhile, the learning device 1000 may allow the transfer network 200 to generate each of the first feature-level data, each of which has a size same as the size of each of the first image-level data, and to generate each of the second feature-level data, each of which has a size same as the size of each of the second image-level data. For example, the learning device 1000 may allow the transfer network 200 to add second zero padding to each of the first feature maps and each of the second feature maps inputted into the dynamic filtering layer 230 to thereby generate each of first padded feature maps and each of second padded feature maps, and then to filter each of the first padded feature maps by using each of the first augmentation filters and filter each of the second padded feature maps by using each of the second augmentation filters to thereby generate each of the first feature-level data, each of which has the size same as the size of each of the first image-level data, and generate each of the second feature-level data, each of which has the size same as the size of each of the second image-level data.

Also, the learning device 1000 may allow the filter generator 220 of the transfer network 200 to apply a second convolutional operation to each of the first image-level data and each of the second image-level data through at least one second convolutional layer 221 to thereby generate each of first intermediate multiple feature maps corresponding to each of the first image-level data and each of second intermediate multiple feature maps corresponding to each of the second image-level data. Then, the learning device 1000 may allow the filter generator 220 of the transfer network 200 to apply a pooling operation to each of the first intermediate multiple feature maps and each of the second intermediate multiple feature maps through a pooling layer 222 to thereby generate each of first multiple pixel features corresponding to each of the first intermediate multiple feature maps and each of second multiple pixel features corresponding to each of the second intermediate multiple feature maps. Afterwards, the learning device 1000 may allow the filter generator 220 of the transfer network 200 to reshape each of the first multiple pixel features and each of the second multiple pixel features through a reshaping layer (not shown) to thereby generate each of the first augmentation filters corresponding to each of the first multiple pixel features and each of the second augmentation filters corresponding to each of the second multiple pixel features. In other words, the filter generator 220 of the transfer network 200 may generate augmentation filters by having outputs obtained from the second convolution operation and the pooling operation as their weights, and accordingly the dynamic filtering layer 230 may perform augmentation on feature maps corresponding to the image-level data. That is, unlike conventional convolution operations which use predetermined weights of convolution filters, the dynamic filtering layer 230 may use the weights of the augmentation filters dynamically generated from the image-level data through the filter generator 220, to thereby perform the augmentation on the feature maps.

In detail, the learning device 1000 may allow the filter generator 220 of the transfer network 200 to apply the second convolution operation to each of the first image-level data and each of the second image-level data by using each of $n^2$ convolution filters through the second convolutional layer 221 to thereby generate each of the first intermediate multiple feature maps having $n^2$ channels and each of the second intermediate multiple feature maps having $n^2$ channels. For example, if the second convolution operation is applied to each of the first image-level data and each of the second image-level data through the second convolutional layer 221 with a convolution filter of a dimension (3×3×9), each of the first intermediate multiple feature maps having 9 channels and each of the second intermediate multiple feature maps having 9 channels may be generated.

Next, the learning device 1000 may allow the filter generator 220 of the transfer network 200 to apply a global average pooling operation or a global max pooling operation to each of the first intermediate multiple feature maps and each of the second intermediate multiple feature maps through the pooling layer 222 to thereby generate each of the first multiple pixel features having $n^2$ channels and each of the second multiple pixel features having $n^2$ channels. Then, the learning device 1000 may allow the filter generator 220 of the transfer network 200 to reshape each of the first multiple pixel features into a single channel and reshape each of the second multiple pixel features into a single channel to thereby generate each of the first augmentation filters having a dimension of n×n×1 and each of the second augmentation filters having a dimension of n×n×1. For example, if the first intermediate multiple feature maps having the 9 channels and each of the second intermediate multiple feature maps having the 9 channels are generated as mentioned above, each of the first multiple pixel features having 9 channels and each of the second multiple pixel features having 9 channels may be generated as a result of the pooling operation, and accordingly each of the first augmentation filters having a dimension of 3×3×1 and each of the second augmentation filters having a dimension of 3×3×1 may be generated as a result of reshaping each of the first multiple pixel features and each of the second multiple pixel features.

Meanwhile, the learning device 1000 may allow the transfer network 200 to generate each of the first intermediate multiple feature maps, each of which has a size same as the size of each of the first image-level data, and to generate each of the second intermediate multiple feature maps, each of which has a size same as the size of each of the second image-level data. For example, the learning device 1000 may allow the filter generator 220 of the transfer network 200 to add third zero padding to each of the first image-level data and each of the second image-level data inputted into the second convolution layer 221 to thereby generate each of (1_2)-nd padded image-level data and each of (2_2)-nd padded image-level data, and then to apply the second convolution operation to each of the (1_2)-nd image-level data and each of the (2_2)-nd image-level data to thereby generate each of the first intermediate multiple feature maps, each of which has the size same as the size of each of the first image-level data, and generate each of the second intermediate multiple feature maps, each of which has the size same as the size of each of the second image-level data.

By referring to FIG. 3 again, the learning device 1000 may input each of the first feature-level data and each of the second feature-level data into the trained perception network 100 which has been trained by the method of FIG. 2, to thereby allow the trained perception network 100 to perceive each of the first feature-level data and each of the second feature-level data and thus to generate second prediction results. Then, the learning device 1000 may generate each of second losses by referring to each of the second prediction results against each of their corresponding first ground truths or each of their corresponding second ground truths and thus train the transfer network 200 by using each of the second losses, resulting in a generation of a trained transfer network 200.

For example, the learning device 1000 may train the transfer network 200 by updating weights of the first convolutional layer 210 and weights of the second convolutional layer 221 through back-propagation using the second losses.

Herein, the learning device 1000 may fix the weights of the perception network 100 during the back-propagation using the second losses. That is, during the back-propagation using the second losses, only weights of the transfer network 200, i.e., the weights of the first convolutional layer 210 and the weights of the second convolutional layer 221, are updated, and the weights of the perception network 100 are not updated.

Through this, the transfer network 200 may be trained (i) to generate the first feature-level data preserving the image quality characteristics of the first image-level data by using the first image-level data as identities, and (ii) to generate the second feature-level data by converting the image quality characteristics of the second image-level data into the image quality characteristics of the first image-level data.

Figure 5:
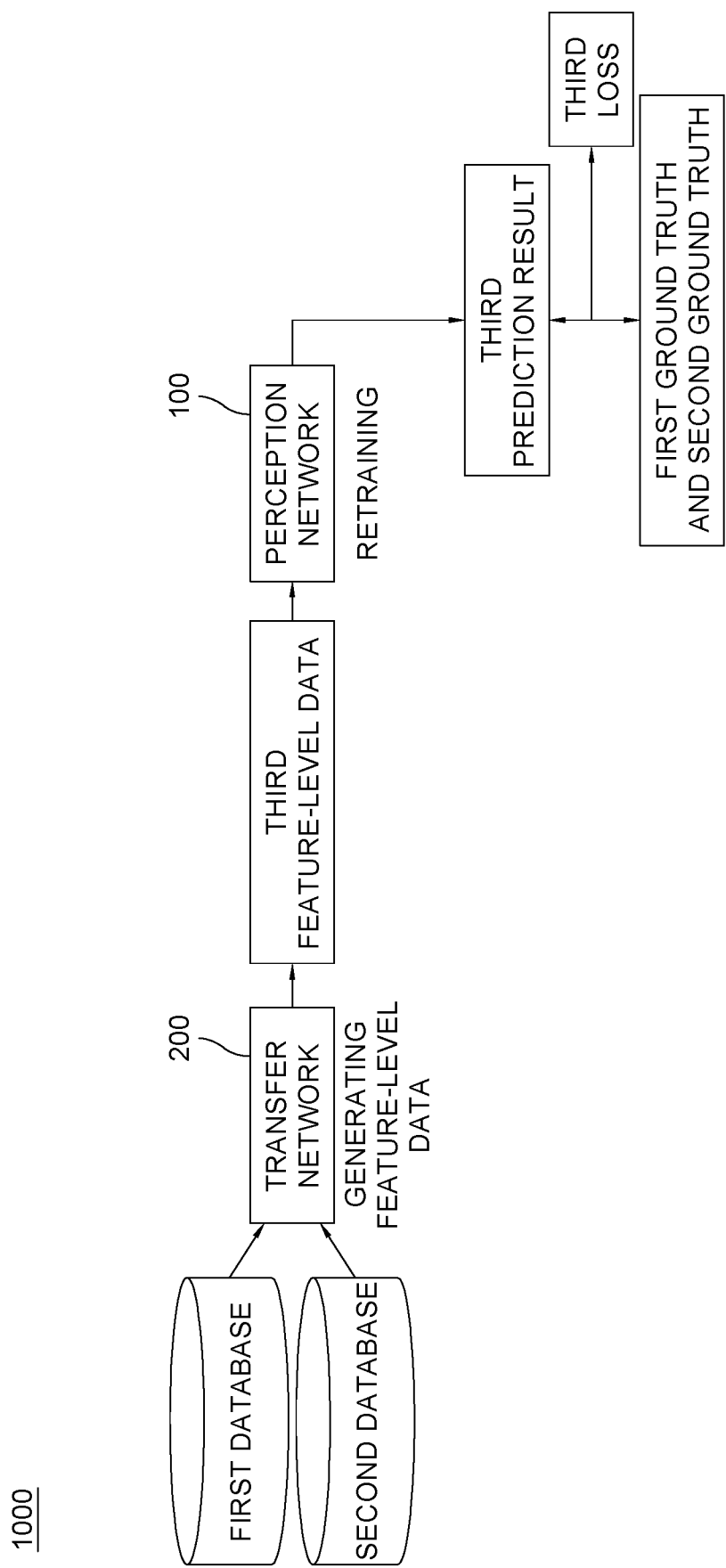
FIG. 5 is a drawing schematically illustrating a process for retraining the perception network by using the image-level data obtained from the multiple imaging devices having the specifications different from each other in accordance with one example embodiment of the present disclosure.

Next, FIG. 5 is schematically illustrating a process for retraining the trained perception network 100 by using the image-level data obtained from the multiple imaging devices having the specifications different from each other in accordance with one example embodiment of the present disclosure.

By referring to FIG. 5, the learning device 1000 may input each of the first image-level data and each of the second image-level data into the trained transfer network 200, to thereby allow the trained transfer network 200 to augment each of the first image-level data and each of the second image-level data and thus to generate each of third feature-level data corresponding to each of the first image-level data or each of the second image-level data. Herein, the third feature-level data may be generated in a similar way the first feature-level data and the second feature-level data are generated.

In detail, the learning device 1000 may allow the trained transfer network 200 to apply the first convolutional operation to each of the first image-level data and each of the second image-level data through the first convolutional layer 210 to thereby generate each of third feature maps corresponding to each of the first image-level data or each of the second image-level data.

Herein, the learning device 1000 may allow the trained transfer network 200 to generate each of the third feature maps, each of which has a size same as the size of each of the first image-level data or the size of each of the second image-level data. For example, the learning device 1000 may allow the trained transfer network 200 to add the first zero padding to each of the first image-level data and each of the second image-level data inputted into the first convolutional layer 210 to thereby generate each of (3_1)-st padded image-level data, and then to apply the first convolutional operation to each of the (3_1)-st padded image-level data to thereby generate each of the third feature maps, each of which has the size same as the size of each of the first image-level data or the size of the second image-level data. Herein, the first image-level data and the second image-level data may be images of the same size but the present disclosure is not limited thereto.

Following, the learning device 1000 may allow the trained transfer network 200 to generate each of third augmentation filters corresponding to each of the first image-level data or each of the second image-level data through the filter generator 220, and then to filter each of the third feature maps by using each of the third augmentation filters through the dynamic filtering layer 230 to thereby generate each of the third feature-level data.

Meanwhile, the learning device 1000 may allow the trained transfer network 200 to generate each of the third feature-level data, each of which has a size same as the size of each of the first image-level data or the size of each of the second image-level data. For example, the learning device 1000 may allow the trained transfer network 200 to add the second zero padding to each of the third feature maps inputted into the dynamic filtering layer 230 to thereby generate each of third padded feature maps, and then to filter each of the third padded feature maps by using each of the third augmentation filters to thereby generate each of the third feature-level data, each of which has the size same as the size of each of the first image-level data or the size of each of the second image-level data.

Also, the learning device 1000 may allow the filter generator 220 of the trained transfer network 200 to apply the second convolutional operation to each of the first image-level data and each of the second image-level data through the second convolutional layer 221 to thereby generate each of third intermediate multiple feature maps corresponding to each of the first image-level data or each of the second image-level data. Then, the learning device 1000 may allow the filter generator 220 of the trained transfer network 200 to apply the pooling operation to each of the third intermediate multiple feature maps through the pooling layer 222 to thereby generate each of third multiple pixel features corresponding to each of the third intermediate multiple feature maps. Afterwards, the learning device 1000 may allow the filter generator 220 of the trained transfer network 200 to reshape each of the third multiple pixel features through the reshaping layer (not shown) to thereby generate each of the third augmentation filters corresponding to each of the first multiple pixel features or each of the second multiple pixel features.

In detail, the learning device 1000 may allow the filter generator 220 of the trained transfer network 200 to apply the second convolution operation to each of the first image-level data and each of the second image-level data by using each of the $n^2$ convolution filters through the second convolutional layer 221 to thereby generate each of the third intermediate multiple feature maps having $n^2$ channels. For example, if the second convolution operation is applied to each of the first image-level data and each of the second image-level data through the second convolutional layer 221 with the convolution filter of the dimension (3×3×9), each of the third intermediate multiple feature maps having 9 channels may be generated.

Next, the learning device 1000 may allow the filter generator 220 of the trained transfer network 200 to apply the global average pooling operation or the global max pooling operation to each of the third intermediate multiple feature maps through the pooling layer 222 to thereby generate each of the third multiple pixel features having $n^2$ channels. Then, the learning device 1000 may allow the filter generator 220 of the trained transfer network 200 to reshape each of the third multiple pixel features into a single channel to thereby generate each of the third augmentation filters having a dimension of n×n×1. For example, if the third intermediate multiple feature maps having the 9 channels are generated as mentioned above, each of the third multiple pixel features having 9 channels may be generated as a result of the pooling operation, and accordingly each of the third augmentation filters having a dimension of 3×3×1 may be generated as a result of reshaping each of the third multiple pixel features.

Meanwhile, the learning device 1000 may allow the trained transfer network 200 to generate each of the third intermediate multiple feature maps, each of which has a size same as the size of each of the first image-level data or the size of each of the second image-level data. For example, the learning device 1000 may allow the filter generator 220 of the transfer network 200 to add the third zero padding to each of the first image-level data and each of the second image-level data inputted into the second convolution layer 221 to thereby generate each of (3_2)-nd padded image-level data, and then to apply the second convolution operation to each of the (3_2)-nd image-level data to thereby generate each of the third intermediate multiple feature maps, each of which has the size same as the size of each of the first image-level data or the size of each of the second image-level data.

Thereafter, by referring to FIG. 5 again, the learning device 1000 may input each of the third feature-level data into the trained perception network 100, to thereby allow the trained perception network 100 to perceive each of the third feature-level data and thus to generate third prediction results. Then, the learning device 1000 may generate each of third losses by referring to each of the third prediction results against each of their corresponding first ground truths or each of their corresponding second ground truths and thus retrain the trained perception network 100 by using each of the third losses, resulting in a generation of a retrained perception network 100.

For example, the learning device 1000 may retrain the trained perception network 100 by updating weights of the trained perception network 100 through back-propagation using the third losses.

Meanwhile, given that the perception network 100 and the transfer network 200 have been trained as stated above, a method for testing the perception network by using the image-level data obtained from the multiple imaging devices having the specifications different from each other in accordance with one example embodiment of the present disclosure is explained below by referring to FIGS. 6 and 7. In the following description, detailed explanation of parts that can be easily understood from the description provided by referring to FIGS. 2 to 5 are omitted.

Hereinafter, the phrase "for testing" or "testing" is added for terms related to the testing process, to avoid possible confusion.

Figure 6:
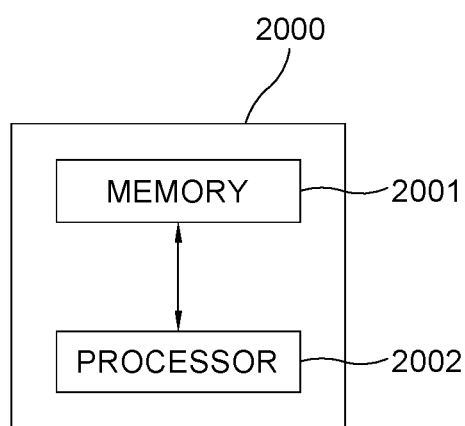
FIG. 6 is a drawing schematically illustrating a testing device for testing the perception network by using the image-level data obtained from the multiple imaging devices having the specifications different from each other in accordance with one example embodiment of the present disclosure.

First, FIG. 6 is a drawing schematically illustrating a testing device 2000 for testing the perception network 100 by using the image-level data obtained from the multiple imaging devices having the specifications different from each other in accordance with one example embodiment of the present disclosure.

By referring to FIG. 6, the testing device 2000 may include a memory 2001 for testing the perception network 100 by using the image-level data obtained from the multiple imaging devices having the specifications different from each other, and a processor 2002 for testing the perception network 100 by using the image-level data obtained from the multiple imaging devices having the specifications different from each other according to the instructions in the memory 2001.

Specifically, the testing device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of testing the perception network 100 with the image-level data obtained from the multiple imaging devices having the specifications different from each other by using the testing device 2000 configured as explained above is described by referring to FIG. 7.

By referring to FIG. 7, the testing device 2000, upon acquiring at least one image-level data for testing from the first imaging device or the second imaging device, may input the image-level data for testing into the trained transfer network 200, to thereby allow the trained transfer network 200 to augment the image-level data for testing and thus to generate a feature-level data for testing corresponding to the image-level data for testing.

In detail, the testing device 2000 may allow the trained transfer network 200 to apply the first convolutional operation to the image-level data for testing through the first convolutional layer 210 to thereby generate a feature map for testing corresponding to the image-level data for testing.

Herein, the testing device 2000 may allow the trained transfer network 200 to generate the feature map for testing which has a size same as a size of the image-level data for testing. For example, the testing device 2000 may allow the trained transfer network 200 to add the first zero padding to the image-level data for testing inputted into the first convolutional layer 210 to thereby generate a first padded image-level data for testing, and then to apply the first convolutional operation to the first padded image-level data for testing to thereby generate the feature map for testing, which has the size same as the size of the image-level data for testing.

Following, the testing device 2000 may allow the trained transfer network 200 to generate an augmentation filter for testing corresponding to the image-level data for testing through the filter generator 220, and then to filter the feature map for testing by using the augmentation filter for testing through the dynamic filtering layer 230 to thereby generate the feature-level data for testing.

Meanwhile, the testing device 2000 may allow the trained transfer network 200 to generate the feature-level data for testing which has a size same as the size of the image-level data for testing. For example, the testing device 2000 may allow the trained transfer network 200 to add the second zero padding to the feature map for testing inputted into the dynamic filtering layer 230 to thereby generate a padded feature map for testing, and then to filter the padded feature map for testing by using the augmentation filter for testing to thereby generate the feature-level data for testing, which has the size same as the size of the image-level data for testing.

Further, the testing device 2000 may allow the filter generator 220 of the trained transfer network 200 to apply the second convolutional operation to the image-level data for testing through the second convolutional layer 221 to thereby generate intermediate multiple feature maps for testing corresponding to the image-level data for testing. Then, the testing device 2000 may allow the filter generator 220 of the trained transfer network 200 to apply the pooling operation to the intermediate multiple feature maps for testing through the pooling layer 222 to thereby generate multiple pixel features for testing corresponding to the intermediate multiple feature maps for testing. Afterwards, the testing device 2000 may allow the filter generator 220 of the trained transfer network 200 to reshape the multiple pixel features for testing through the reshaping layer to thereby generate the augmentation filter for testing corresponding to the multiple pixel features for testing.

In detail, the testing device 2000 may allow the filter generator 220 of the trained transfer network 200 to apply the second convolution operation to the image-level data for testing by using the $n^2$ convolution filters through the second convolutional layer 221 to thereby generate the intermediate multiple feature maps for testing having $n^2$ channels. For example, if the second convolution operation is applied to each of the image-level data for testing through the second convolutional layer 221 with the convolution filter of the dimension (3×3×9), each of the intermediate multiple feature maps for testing having 9 channels may be generated.

Next, the testing device 2000 may allow the filter generator 220 of the trained transfer network 200 to apply the global average pooling operation or the global max pooling operation to the intermediate multiple feature maps for testing through the pooling layer 222 to thereby generate the multiple pixel features for testing having $n^2$ channels. Then, the testing device 2000 may allow the filter generator 220 of the trained transfer network 200 to reshape the multiple pixel features for testing into a single channel to thereby generate the augmentation filter for testing having a dimension of n×n×1. For example, if the intermediate multiple feature maps for testing having the 9 channels are generated as mentioned above, the multiple pixel features for testing having 9 channels may be generated as a result of the pooling operation, and accordingly the augmentation filter for testing having a dimension of 3×3×1 may be generated as a result of reshaping the multiple pixel features for testing.

Meanwhile, the testing device 2000 may allow the trained transfer network 200 to generate the intermediate multiple feature maps for testing, each of which has a size same as the size of the image-level data for testing. For example, the testing device 2000 may allow the filter generator 220 of the trained transfer network 200 to add the third zero padding to the image-level data for testing inputted into the second convolution layer 221 to thereby generate a second padded image-level data for testing, and then to apply the second convolution operation to the second padded image-level data for testing to thereby generate the intermediate multiple feature maps for testing, each of which has the size same as the size of the image-level data for testing.

Next, by referring to FIG. 7 again, the testing device 2000 may input the feature-level data for testing into the retrained perception network 100, to thereby allow the retrained perception network 100 to perceive the feature-level data for testing and thus to generate a prediction result for testing.

Herein, the retrained perception network 100 may include at least one of the recognition network capable of recognizing the image-level data for testing, the object detection network capable of detecting objects on the image-level data for testing, the segmentation network capable of classifying each of pixels included in the image-level data for testing, and the tracking network capable of tracking the objects on the image-level data for testing.

The present disclosure has an effect of training the perception network, which has been optimized to analyze data produced from the specific imaging device, by utilizing existing training data to minimize a need for new training data.

The present disclosure has another effect of converting the image-level data, obtained from the multiple imaging devices having the specifications different from each other, into the feature-level data corresponding to the specific image format of the specific imaging device by augmenting the image-level data through the transfer network such that the image-level data obtained from the multiple imaging devices having the various specifications are made suitable for learning and testing of the perception network.

The present disclosure has still another effect of allowing the perception network to perform its data analysis irrespective of which specific image format of the specific imaging device the perception network has been optimized to by converting the image-level data of various image formats to the feature-level data of the specific image format.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a perception network by using images obtained from multiple imaging devices having specifications different from each other, comprising steps of:
    (a) a learning device performing or supporting another device to perform processes of:
        inputting each of first image-level data obtained from a first imaging device into a perception network, to thereby allow the perception network to perceive each of the first image-level data and thus to generate first prediction results, and generating each of first losses by referring to each of the first prediction results against each of their corresponding first ground truths of each of the first image-level data and thus training the perception network by using each of the first losses, resulting in a generation of a trained perception network;

(b) the learning device performing or supporting another device to perform processes of:

inputting each of second image-level data, obtained from a second imaging device whose specifications are different from specifications of the first imaging device, and each of the first image-level data into a transfer network, to thereby allow the transfer network to augment each of the first image-level data and each of the second image-level data and thus to generate each of first feature-level data corresponding to each of the first image-level data and each of second feature-level data corresponding to each of the second image-level data, inputting each of the first feature-level data and each of the second feature-level data into the trained perception network, to thereby allow the trained perception network to perceive each of the first feature-level data and each of the second feature-level data and thus to generate second prediction results, and generating each of second losses by referring to each of the second prediction results against each of their corresponding first ground truths of each of the first image-level data or each of their corresponding second ground truths of each of the second image-level data and thus training the transfer network by using each of the second losses, resulting in a generation of a trained transfer network; and (c) the learning device performing or supporting another device to perform processes of:

inputting each of the first image-level data and each of the second image-level data into the trained transfer network, to thereby allow the trained transfer network to augment each of the first image-level data and each of the second image-level data and thus to generate each of third feature-level data corresponding to each of the first image-level data or each of the second image-level data, inputting each of the third feature-level data into the trained perception network, to thereby allow the trained perception network to perceive each of the third feature-level data and thus to generate third prediction results, and generating each of third losses by referring to each of the third prediction results against each of their corresponding first ground truths of each of the first image-level data or each of their corresponding second ground truths of each of the second image-level data and thus retraining the trained perception network by using each of the third losses, resulting in a generation of a retrained perception network.

2. The method of claim 1, wherein, at the step of (b), the learning device performs or supports another device to perform a process of allowing the transfer network to:

apply a first convolutional operation to each of the first image-level data and each of the second image-level data through at least one first convolutional layer to thereby generate each of first feature maps corresponding to each of the first image-level data and each of second feature maps corresponding to each of the second image-level data, generate each of first augmentation filters corresponding to each of the first image-level data and each of second augmentation filters corresponding to each of the second image-level data through a filter generator, and filter each of the first feature maps by using each of the first augmentation filters and filter each of the second feature maps by using each of the second augmentation filters through a dynamic filtering layer to thereby generate each of the first feature-level data and each of the second feature-level data.

3. The method of claim 2, wherein the learning device performs or supports another device to perform a process of allowing the filter generator of the transfer network to:

apply a second convolutional operation to each of the first image-level data and each of the second image-level data through at least one second convolutional layer to thereby generate each of first intermediate multiple feature maps corresponding to each of the first image-level data and each of second intermediate multiple feature maps corresponding to each of the second image-level data, apply a pooling operation to each of the first intermediate multiple feature maps and each of the second intermediate multiple feature maps through a pooling layer to thereby generate each of first multiple pixel features corresponding to each of the first intermediate multiple feature maps and each of second multiple pixel features corresponding to each of the second intermediate multiple feature maps, and reshape each of the first multiple pixel features and each of the second multiple pixel features through a reshaping layer to thereby generate each of the first augmentation filters corresponding to each of the first multiple pixel features and each of the second augmentation filters corresponding to each of the second multiple pixel features.

4. The method of claim 3, wherein the learning device performs or supports another device to perform a process of allowing the transfer network to:

generate each of the first feature maps, each of the first intermediate multiple feature maps, and each of the first feature-level data, each of which has a size same as a size of each of the first image-level data, and generate each of the second feature maps, each of the second intermediate multiple feature maps, and each of the second feature-level data, each of which has a size same as a size of each of the second image-level data.

5. The method of claim 2, wherein the learning device performs or supports another device to perform a process of allowing the transfer network to:

add first zero padding to each of the first image-level data and each of the second image-level data inputted into the first convolutional layer to thereby generate each of (1_1)-st padded image-level data and each of (2_1)-st padded image-level data, and then to apply the first convolutional operation to each of the (1_1)-st padded image-level data and each of the (2_1)-st padded image-level data to thereby generate each of the first feature maps, each of which has a size same as a size of each of the first image-level data, and generate each of the second feature maps, each of which has a size same as a size of the second image-level data, and add second zero padding to each of the first feature maps and each of the second feature maps inputted into the dynamic filtering layer to thereby generate each of first padded feature maps and each of second padded feature maps, and then to filter each of the first padded feature maps by using each of the first augmentation filters and filter each of the second padded feature maps by using each of the second augmentation filters to thereby generate each of the first feature-level data, each of which has a size same as the size of each of the first image-level data, and generate each of the second feature-level data, each of which has a size same as the size of each of the second image-level data.

6. The method of claim 3, wherein the learning device performs or supports another device to perform a process of allowing the filter generator of the transfer network to add third zero padding to each of the first image-level data and each of the second image-level data inputted into the second convolution layer to thereby generate each of (1_2)-nd padded image-level data and each of (2_2)-nd padded image-level data, and then to apply the second convolution operation to each of the (1_2)-nd image-level data and each of the (2_2)-nd image-level data to thereby generate each of the first intermediate multiple feature maps, each of which has a size same as a size of each of the first image-level data, and generate each of the second intermediate multiple feature maps, each of which has a size same as a size of each of the second image-level data.

7. The method of claim 3, wherein the learning device performs or supports another device to perform a process of allowing the filter generator of the transfer network to:
  apply the second convolution operation to each of the first image-level data and each of the second image-level data by using each of $n^2$ convolution filters through the second convolutional layer to thereby generate each of the first intermediate multiple feature maps having $n^2$ channels and each of the second intermediate multiple feature maps having $n^2$ channels,
  apply a global average pooling operation or a global max pooling operation to each of the first intermediate multiple feature maps and each of the second intermediate multiple feature maps through the pooling layer to thereby generate each of the first multiple pixel features having $n^2$ channels and each of the second multiple pixel features having $n^2$ channels, and
  reshape each of the first multiple pixel features into a single channel and reshape each of the second multiple pixel features into a single channel to thereby generate each of the first augmentation filters having a dimension of n×n×1 and each of the second augmentation filters having a dimension of n×n×1.

8. The method of claim 1, wherein at least one of sensor type, megapixel count, aspect ratio, ISO sensitivity, shutter speed, and focus area included in the specifications of the second imaging device is different from at least one of those of the first imaging device.

9. The method of claim 1, wherein the perception network includes at least one of a recognition network capable of recognizing each of the first image-level data and each of the second image-level data, an object detection network capable of detecting objects on each of the first image-level data and each of the second image-level data, a segmentation network capable of classifying each of pixels included in each of the first image-level data and each of the second image-level data, and a tracking network capable of tracking the objects on each of the first image-level data and each of the second image-level data.

10. A method for testing a perception network by using images obtained from multiple imaging devices having specifications different from each other, comprising steps of:
  (a) a testing device performing or supporting another device to perform a process of acquiring at least one image-level data for testing from a first imaging device or a second imaging device, on condition that a learning device has performed or supported another device to perform processes of:
    inputting each of first image-level data for training obtained from the first imaging device into a perception network, to thereby allow the perception network to perceive each of the first image-level data for training and thus to generate first prediction results for training, and
    generating each of first losses by referring to each of the first prediction results for training against each of their corresponding first ground truths of each of the first image-level data for training and thus training the perception network by using each of the first losses, resulting in a generation of a trained perception network,
    inputting each of second image-level data for training, obtained from the second imaging device whose specifications are different from specifications of the first imaging device, and each of the first image-level data for training into a transfer network, to thereby allow the transfer network to augment each of the first image-level data for training and each of the second image-level data for training and thus to generate each of first feature-level data for training corresponding to each of the first image-level data for training and each of second feature-level data for training corresponding to each of the second image-level data for training
    inputting each of the first feature-level data for training and each of the second feature-level data for training into the trained perception network, to thereby allow the trained perception network to perceive each of the first feature-level data for training and each of the second feature-level data for training and thus to generate second prediction results for training,
    generating each of second losses by referring to each of the second prediction results for training against each of their corresponding first ground truths of each of the first image-level data for training or each of their corresponding second ground truths of each of the second image-level data for training and thus training the transfer network by using each of the second losses, resulting in a generation of a trained transfer network,
    inputting each of the first image-level data for training and each of the second image-level data for training into the trained transfer network, to thereby allow the trained transfer network to augment each of the first image-level data for training and each of the second image-level data for training and thus to generate each of third feature-level data for training corresponding each of the first image-level data for training or each of the second image-level data for training,
    inputting each of the third feature-level data for training into the trained perception network, to thereby allow the trained perception network to perceive each of the third feature-level data for training and thus to generate third prediction results for training, and
    generating each of third losses by referring to each of the third prediction results for training against each of their corresponding first ground truths of each of the first image-level data for training or each of their corresponding second ground truths of each of the second image-level data for training and thus retraining the trained perception network by using each of the third losses, resulting in a generation of a retrained perception network; and (b) the testing device performing or supporting another device to perform processes of:
inputting the image-level data for testing into the trained transfer network, to thereby allow the trained transfer network to augment the image-level data for testing and thus to generate a feature-level data for testing corresponding to the image-level data for testing, and
inputting the feature-level data for testing into the retrained perception network, to thereby allow the retrained perception network to perceive the feature-level data for testing and thus to generate a prediction result for testing.

11. The method of claim 10, wherein, at the step of (b), the testing device performs or supports another device to perform a process of allowing the trained transfer network to:
apply a first convolutional operation to the image-level data for testing through at least one first convolutional layer to thereby generate a feature map for testing corresponding to the image-level data for testing,
generate an augmentation filter for testing corresponding to the image-level data for testing through a filter generator, and
filter the feature map for testing by using the augmentation filter for testing through a dynamic filtering layer to thereby generate the feature-level data for testing.

12. The method of claim 11, wherein the testing device performs or supports another device to perform a process of allowing the filter generator of the trained transfer network to:
apply a second convolutional operation to the image-level data for testing through at least one second convolutional layer to thereby generate intermediate multiple feature maps for testing corresponding to the image-level data for testing,
apply a pooling operation to the intermediate multiple feature maps for testing through a pooling layer to thereby generate multiple pixel features for testing corresponding to the intermediate multiple feature maps for testing, and
reshape the multiple pixel features for testing through a reshaping layer to thereby generate the augmentation filter for testing corresponding to the multiple pixel features for testing.

13. The method of claim 12, wherein the testing device performs or supports another device to perform a process of allowing the trained transfer network to generate the feature map for testing, the intermediate multiple feature maps for testing, and the feature-level data for testing, each of which has a size same as a size of the image-level data for testing.

14. The method of claim 11, wherein the testing device performs or supports another device to perform a process of allowing the trained transfer network to:
add first zero padding to the image-level data for testing inputted into the first convolutional layer to thereby generate a first padded image-level data for testing, and then to apply the first convolutional operation to the first padded image-level data for testing to thereby generate the feature map for testing, which has a size same as a size of the image-level data for testing, and
add second zero padding to the feature map for testing inputted into the dynamic filtering layer to thereby generate a padded feature map for testing, and then to filter the padded feature map for testing by using the augmentation filter for testing to thereby generate the feature-level data for testing, which has a size same as the size of the image-level data for testing.

15. The method of claim 12, wherein the testing device performs or supports another device to perform a process of allowing the filter generator of the trained transfer network to add third zero padding to the image-level data for testing inputted into the second convolution layer to thereby generate a second padded image-level data for testing, and then to apply the second convolution operation to the second padded image-level data for testing to thereby generate the intermediate multiple feature maps for testing, each of which has a size same as a size of the image-level data for testing.

16. The method of claim 12, wherein the testing device performs or supports another device to perform a process of allowing the filter generator of the trained transfer network to:
apply the second convolution operation to the image-level data for testing by using $n^2$ convolution filters through the second convolutional layer to thereby generate the intermediate multiple feature maps for testing having $n^2$ channels,
apply a global average pooling operation or a global max pooling operation to the intermediate multiple feature maps for testing through the pooling layer to thereby generate the multiple pixel features for testing having $n^2$ channels, and
reshape the multiple pixel features for testing into a single channel to thereby generate the augmentation filter for testing having a dimension of $n \times n \times 1$.

17. A learning device for training a perception network by using images obtained from multiple imaging devices having specifications different from each other, comprising:
at least one memory that stores instructions; and
at least one processor configured to execute the instructions to perform or support another device to perform:
first processes of:
inputting each of first image-level data obtained from a first imaging device into a perception network, to thereby allow the perception network to perceive each of the first image-level data and thus to generate first prediction results, and
generating each of first losses by referring to each of the first prediction results against each of their corresponding first ground truths of each of the first image-level data and thus training the perception network by using each of the first losses, resulting in a generation of a trained perception network,
second processes of:
inputting each of second image-level data, obtained from a second imaging device whose specifications are different from specifications of the first imaging device, and each of the first image-level data into a transfer network, to thereby allow the transfer network to augment each of the first image-level data and each of the second image-level data and thus to generate each of first feature-level data corresponding to each of the first image-level data and each of second feature-level data corresponding to each of the second image-level data,
inputting each of the first feature-level data and each of the second feature-level data into the trained perception network, to thereby allow the trained perception network to perceive each of the first feature-level data and each of the second feature-level data and thus to generate second prediction results, and generating each of second losses by referring to each of the second prediction results against each of their corresponding first ground truths of each of the first image-level data or each of their corresponding second ground truths of each of the second image-level data and thus training the transfer network by using each of the second losses, resulting in a generation of a trained transfer network, and third processes of:
  inputting each of the first image-level data and each of the second image-level data into the trained transfer network, to thereby allow the trained transfer network to augment each of the first image-level data and each of the second image-level data and thus to generate each of third feature-level data corresponding to each of the first image-level data or each of the second image-level data,
  inputting each of the third feature-level data into the trained perception network, to thereby allow the trained perception network to perceive each of the third feature-level data and thus to generate third prediction results, and
  generating each of third losses by referring to each of the third prediction results against each of their corresponding first ground truths of each of the first image-level data or each of their corresponding second ground truths of each of the second image-level data and thus retraining the trained perception network by using each of the third losses, resulting in a generation of a retrained perception network.

18. The learning device of claim 17, wherein, at the second processes, the processor performs or supports another device to perform a process of allowing the transfer network to:
  apply a first convolutional operation to each of the first image-level data and each of the second image-level data through at least one first convolutional layer to thereby generate each of first feature maps corresponding to each of the first image-level data and each of second feature maps corresponding to each of the second image-level data,
  generate each of first augmentation filters corresponding to each of the first image-level data and each of second augmentation filters corresponding to each of the second image-level data through a filter generator, and
  filter each of the first feature maps by using each of the first augmentation filters and filter each of the second feature maps by using each of the second augmentation filters through a dynamic filtering layer to thereby generate each of the first feature-level data and each of the second feature-level data.

19. The learning device of claim 18, wherein the processor performs or supports another device to perform a process of allowing the filter generator of the transfer network to:
  apply a second convolutional operation to each of the first image-level data and each of the second image-level data through at least one second convolutional layer to thereby generate each of first intermediate multiple feature maps corresponding to each of the first image-level data and each of second intermediate multiple feature maps corresponding to each of the second image-level data,
  apply a pooling operation to each of the first intermediate multiple feature maps and each of the second intermediate multiple feature maps through a pooling layer to thereby generate each of first multiple pixel features corresponding to each of the first intermediate multiple feature maps and each of second multiple pixel features corresponding to each of the second intermediate multiple feature maps, and
  reshape each of the first multiple pixel features and each of the second multiple pixel features through a reshaping layer to thereby generate each of the first augmentation filters corresponding to each of the first multiple pixel features and each of the second augmentation filters corresponding to each of the second multiple pixel features.

20. The learning device of claim 19, wherein the processor performs or supports another device to perform a process of allowing the transfer network to:
  generate each of the first feature maps, each of the first intermediate multiple feature maps, and each of the first feature-level data, each of which has a size same as a size of each of the first image-level data, and
  generate each of the second feature maps, each of the second intermediate multiple feature maps, and each of the second feature-level data, each of which has a size same as a size of each of the second image-level data.

21. The learning device of claim 18, wherein the processor performs or supports another device to perform a process of allowing the transfer network to:
  add first zero padding to each of the first image-level data and each of the second image-level data inputted into the first convolutional layer to thereby generate each of (1_1)-st padded image-level data and each of (2_1)-st padded image-level data, and then to apply the first convolutional operation to each of the (1_1)-st padded image-level data and each of the (2_1)-st padded image-level data to thereby generate each of the first feature maps, each of which has a size same as a size of each of the first image-level data, and generate each of the second feature maps, each of which has a size same as a size of the second image-level data, and
  add second zero padding to each of the first feature maps and each of the second feature maps inputted into the dynamic filtering layer to thereby generate each of first padded feature maps and each of second padded feature maps, and then to filter each of the first padded feature maps by using each of the first augmentation filters and filter each of the second padded feature maps by using each of the second augmentation filters to thereby generate each of the first feature-level data, each of which has a size same as the size of each of the first image-level data, and generate each of the second feature-level data, each of which has a size same as the size of each of the second image-level data.

22. The learning device of claim 19, wherein the processor performs or supports another device to perform a process of allowing the filter generator of the transfer network to add third zero padding to each of the first image-level data and each of the second image-level data inputted into the second convolution layer to thereby generate each of (1_2)-nd padded image-level data and each of (2_2)-nd padded image-level data, and then to apply the second convolution operation to each of the (1_2)-nd image-level data and each of the (2_2)-nd image-level data to thereby generate each of the first intermediate multiple feature maps, each of which has a size same as a size of each of the first image-level data, and generate each of the second intermediate multiple feature maps, each of which has a size same as a size of each of the second image-level data.

23. The learning device of claim 19, wherein the processor performs or supports another device to perform a process of allowing the filter generator of the transfer network to:

apply the second convolution operation to each of the first image-level data and each of the second image-level data by using each of $n^2$ convolution filters through the second convolutional layer to thereby generate each of the first intermediate multiple feature maps having $n^2$ channels and each of the second intermediate multiple feature maps having $n^2$ channels, apply a global average pooling operation or a global max pooling operation to each of the first intermediate multiple feature maps and each of the second intermediate multiple feature maps through the pooling layer to thereby generate each of the first multiple pixel features having $n^2$ channels and each of the second multiple pixel features having $n^2$ channels, and reshape each of the first multiple pixel features into a single channel and reshape each of the second multiple pixel features into a single channel to thereby generate each of the first augmentation filters having a dimension of n×n×1 and each of the second augmentation filters having a dimension of n×n×1.

24. A testing device for testing a perception network by using images obtained from multiple imaging devices having specifications different from each other, comprising:
at least one memory that stores instructions; and
at least one processor configured to execute the instructions to perform or support another device to perform: first processes of:
acquiring at least one image-level data for testing from a first imaging device or a second imaging device, on condition that a learning device has performed or supported another device to perform processes of:
inputting each of first image-level data for training obtained from a first imaging device into a perception network, to thereby allow the perception network to perceive each of the first image-level data for training and thus to generate first prediction results for training, and
generating each of first losses by referring to each of the first prediction results for training against each of their corresponding first ground truths of each of the first image-level data for training and thus training the perception network by using each of the first losses, resulting in a generation of a trained perception network,
inputting each of second image-level data for training, obtained from a second imaging device whose specifications are different from specifications of the first imaging device, and each of the first image-level data for training into a transfer network, to thereby allow the transfer network to augment each of the first image-level data for training and each of the second image-level data for training and thus to generate each of first feature-level data for training corresponding to each of the first image-level data for training and each of second feature-level data for training corresponding to each of the second image-level data for training,
inputting each of the first feature-level data for training and each of the second feature-level data for training into the trained perception network, to thereby allow the trained perception network to perceive each of the first feature-level data for training and each of the second feature-level data for training and thus to generate second prediction results for training,
generating each of second losses by referring to each of the second prediction results for training against each of their corresponding first ground truths of each of the first image-level data for training or each of their corresponding second ground truths of each of the second image-level data for training and thus training the transfer network by using each of the second losses, resulting in a generation of a trained transfer network,
inputting each of the first image-level data for training and each of the second image-level data for training into the trained transfer network, to thereby allow the trained transfer network to augment each of the first image-level data for training and each of the second image-level data for training and thus to generate each of third feature-level data for training corresponding to each of the first image-level data for training or each of the second image-level data for training,
inputting each of the third feature-level data for training into the trained perception network, to thereby allow the trained perception network to perceive each of the third feature-level data for training and thus to generate third prediction results for training, and
generating each of third losses by referring to each of the third prediction results for training against each of their corresponding first ground truths of each of the first image-level data for training or each of their corresponding second ground truths of each of the second image-level data for training and thus retraining the trained perception network by using each of the third losses, resulting in a generation of a retrained perception network, acquiring at least one image-level data for testing from the first imaging device or the second imaging device, and
second process of:
inputting the image-level data for testing into the trained transfer network, to thereby allow the trained transfer network to augment the image-level data for testing and thus to generate a feature-level data for testing corresponding to the image-level data for testing, and
inputting the feature-level data for testing into the retrained perception network, to thereby allow the retrained perception network to perceive the feature-level data for testing and thus to generate a prediction result for testing.

25. The testing device of claim 24, wherein, at the second processes, the processor performs or supports another device to perform a process of allowing the trained transfer network to:
apply a first convolutional operation to the image-level data for testing through at least one first convolutional layer to thereby generate a feature map for testing corresponding to the image-level data for testing,
generate an augmentation filter for testing corresponding to the image-level data for testing through a filter generator, and
filter the feature map for testing by using the augmentation filter for testing through a dynamic filtering layer to thereby generate the feature-level data for testing.

26. The testing device of claim 25, wherein the processor performs or supports another device to perform a process of allowing the filter generator of the trained transfer network to:
- apply a second convolutional operation to the image-level data for testing through at least one second convolutional layer to thereby generate intermediate multiple feature maps for testing corresponding to the image-level data for testing,
- apply a pooling operation to the intermediate multiple feature maps for testing through a pooling layer to thereby generate multiple pixel features for testing corresponding to the intermediate multiple feature maps for testing, and
- reshape the multiple pixel features for testing through a reshaping layer to thereby generate the augmentation filter for testing corresponding to the multiple pixel features for testing.

27. The testing device of claim 26, wherein the processor performs or supports another device to perform a process of allowing the trained transfer network to generate the feature map for testing, the intermediate multiple feature maps for testing, and the feature-level data for testing, each of which has a size same as a size of the image-level data for testing.

28. The testing device of claim 25, wherein the processor performs or supports another device to perform a process of allowing the trained transfer network to:
- add first zero padding to the image-level data for testing inputted into the first convolutional layer to thereby generate a first padded image-level data for testing, and then to apply the first convolutional operation to the first padded image-level data for testing to thereby generate the feature map for testing, which has a size same as the size of the image-level data for testing, and
- add second zero padding to the feature map for testing inputted into the dynamic filtering layer to thereby generate a padded feature map for testing, and then to filter the padded feature map for testing by using the augmentation filter for testing to thereby generate the feature-level data for testing, which has a size same as the size of the image-level data for testing.

29. The testing device of claim 26, wherein the processor performs or supports another device to perform a process of allowing the filter generator of the trained transfer network to add third zero padding to the image-level data for testing inputted into the second convolution layer to thereby generate a second padded image-level data for testing, and then to apply the second convolution operation to the second padded image-level data for testing to thereby generate the intermediate multiple feature maps for testing, each of which has a size same as a size of the image-level data for testing.

30. The testing device of claim 26, wherein the processor performs or supports another device to perform a process of allowing the filter generator of the trained transfer network to:
- apply the second convolution operation to the image-level data for testing by using $n^2$ convolution filters through the second convolutional layer to thereby generate the intermediate multiple feature maps for testing having $n^2$ channels,
- apply a global average pooling operation or a global max pooling operation to the intermediate multiple feature maps for testing through the pooling layer to thereby generate the multiple pixel features for testing having $n^2$ channels, and
- reshape the multiple pixel features for testing into a single channel to thereby generate the augmentation filter for testing having a dimension of $n \times n \times 1$.

* * * * *